United States Patent
Tai et al.

(10) Patent No.: US 8,549,858 B2
(45) Date of Patent: Oct. 8, 2013

(54) FLOATING TYPE SOLAR ENERGY COLLECTION/POWER DEVICE

(75) Inventors: Chang-Hsien Tai, Neipu Hsiang (TW); Jr-Ming Miao, Neipu Hsiang (TW); Ming-Hui Ho, Neipu Hsiang (TW); Uzu-Kuei Hsu, Neipu Hsiang (TW)

(73) Assignee: National Pingtung University of Science and Technology, Pingtung County (TW)

( * ) Notice: Subject to any disclaimer, the term of this patent is extended or adjusted under 35 U.S.C. 154(b) by 259 days.

(21) Appl. No.: 13/207,546

(22) Filed: Aug. 11, 2011

(65) Prior Publication Data
US 2013/0014507 A1    Jan. 17, 2013

(30) Foreign Application Priority Data
Jul. 12, 2011 (TW) .............................. 100124683 A

(51) Int. Cl.
F03G 7/00 (2006.01)
F03G 6/00 (2006.01)
B60L 8/00 (2006.01)

(52) U.S. Cl.
USPC ...................................... 60/641.8; 60/641.14

(58) Field of Classification Search
USPC ........ 60/641.1, 641.8, 641.9, 641.11–641.15; 126/400, 617–620, 625, 637, 640–642, 126/654, 684, 697, 704
See application file for complete search history.

(56) References Cited

U.S. PATENT DOCUMENTS

| | | | | |
|---|---|---|---|---|
| 3,985,118 A * | 10/1976 | Bard | .............................. | 126/575 |
| 4,006,856 A * | 2/1977 | Nilsson | .......................... | 126/591 |
| 4,077,393 A * | 3/1978 | Mattson | .......................... | 126/709 |
| 4,137,899 A * | 2/1979 | Weslow | ........................... | 126/649 |
| 4,153,105 A * | 5/1979 | Schroder | ................... | 165/104.17 |
| 4,188,941 A | 2/1980 | Hopkins | | |
| 4,289,112 A * | 9/1981 | Roseen | ........................... | 126/568 |
| 4,384,569 A * | 5/1983 | Clearman et al. | ............. | 126/617 |
| 4,458,672 A * | 7/1984 | Wesley | ........................... | 126/606 |
| 4,494,528 A * | 1/1985 | Horton | ........................... | 126/627 |
| 5,941,239 A * | 8/1999 | Rogers | ........................... | 126/698 |
| 6,425,552 B1 * | 7/2002 | Lee et al. | ........................ | 244/97 |
| 6,712,069 B1 * | 3/2004 | Spangler | ....................... | 126/641 |
| 6,881,947 B2 | 4/2005 | Mitsuoka et al. | | |
| 8,387,387 B1 * | 3/2013 | Henderson | ................... | 60/641.8 |
| 2004/0244376 A1 * | 12/2004 | Litwin et al. | ................ | 60/641.8 |

(Continued)

FOREIGN PATENT DOCUMENTS

FR    2506434 A * 11/1982

*Primary Examiner* — Thomas Denion
*Assistant Examiner* — Mickey France
(74) *Attorney, Agent, or Firm* — Alan Kamrath; Kamrath IP Lawfirm, P.A.

(57) ABSTRACT

A floating type solar energy collection/power device includes a base having a compartment receiving a working fluid. A heat collecting assembly is mounted to an opening of the compartment to seal the compartment. A heat conducting assembly is mounted in the compartment and includes a heat conducting tube and a pump. The heat conducting tube includes a first end in communication with the compartment and a second end connected to the pump. The pump draws the first working fluid into the second end of the heat conducting tube via an inlet of the pump. A heat machine includes a compressor, a heat exchanger, and a turbine. The compressor, the heat exchanger, and the turbine are connected to each other by a plurality of pipes. The turbine is connected to a generator. The heat exchanger and the working fluid undergo heat exchange.

13 Claims, 2 Drawing Sheets

(56) References Cited

U.S. PATENT DOCUMENTS

2008/0092541 A1* 4/2008 Palmer .................... 60/641.15
2010/0024422 A1* 2/2010 Henderson ................... 60/641.8
2010/0126171 A1* 5/2010 Smith ......................... 60/641.8

* cited by examiner

FLOATING TYPE SOLAR ENERGY COLLECTION/POWER DEVICE

BACKGROUND OF THE INVENTION

1. Field of the Invention

The present invention relates to a power device and, more particularly, to a floating type solar energy collection/power device.

2. Description of the Related Art

Conventional solar energy collection/power devices include a heat collecting assembly and an energy storage assembly. The heat collecting assembly absorbs the heat energy from the sun. The heat energy is converted into electricity or energy of another type. Then, the energy is outputted to the energy storage assembly so that the user can utilize the stored energy even though there is no sunlight.

In the conventional solar energy collection/power device, the heat energy can be outputted as shaft work through a heat machine. During the conversion, the energy converted per unit time by the heat machine is limited due to system matching. The absorbed solar radiant energy can not be effectively utilized such that the outputted shaft work is small and unstable, reducing the power supply effect of the solar energy collection/power devices.

Furthermore, the heat collecting assembly generally includes a solar panel placed on the ground or a flat roof to absorb the solar radiant energy. The solar panel should not be shielded by objects to effectively absorb the solar energy. However, this causes limitation to the use of the space surrounding the solar panel.

Thus, a need exists for an improved solar energy collection/power device allowing effective use of space and providing a stable power source.

SUMMARY OF THE INVENTION

An objective of the present invention is to provide a floating type solar energy collection/power device that can avoid an uneven energy supply resulting from a change in the sunshine amount, so that the floating type solar energy collection/power device can generate more energy.

Another objective of the present invention is to provide a floating type solar energy collection/power device that can float in the air to reduce the limitation to effective use of space on the ground.

The present invention fulfills the above objectives by providing a floating type solar energy collection/power device including a base having a compartment receiving a first working fluid. A heat collecting assembly is mounted to an opening of the compartment to seal the compartment. A heat conducting assembly is mounted in the compartment and includes a heat conducting tube and a pump. The heat conducting tube includes a first end in communication with the compartment and a second end connected to the pump. The pump draws the first working fluid into the second end of the heat conducting tube via an inlet of the pump. A heat machine includes a compressor, a heat exchanger, and a turbine. The compressor, the heat exchanger, and the turbine are connected to each other by a plurality of pipes. The turbine is connected to a generator. The heat exchanger and the first working fluid undergo heat exchange.

Preferably, the heat collecting assembly includes a light transmitting layer, a heat collecting layer, and a heat collecting panel. The heat collecting layer includes a first surface connected to the light transmitting layer and a second surface connected to the heat collecting panel.

Preferably, the light transmitting layer includes a plurality of light concentrating portions.

Preferably, each of the plurality of light concentrating portions has a concave, arcuate face.

Preferably, the heat collecting layer includes a plurality of first heat collecting sections and a plurality of second heat collecting sections. Each of the plurality of second heat collecting sections is located between two adjacent first heat collecting sections. Each of the plurality of first heat collecting sections is aligned with one of the plurality of light concentrating portions.

Preferably, each of the plurality of first heat collecting sections tapers away from the plurality of light concentrating portions.

Preferably, each of the plurality of second heat collecting sections is filled with a greenhouse gas.

Preferably, the heat collecting panel includes a plurality of heat collecting channels. Each of the plurality of heat collecting channels is aligned with a neck of one of the plurality of first heat collecting sections.

Preferably, the heat conducting tube extends through the plurality of heat collecting channels.

Preferably, the first working fluid is helium.

Preferably, the base is made of a thermally insulating material.

Preferably, the heat machine further includes a preheater located between the compressor and the heat exchanger.

Preferably, the plurality of pipes of the heat machine receives a second working fluid.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and, dimensions of the parts to form the preferred embodiments will be explained or will be within the ability of a person skilled in the art after the following teachings of the present invention have been read and understood. Further, the exact dimensions and dimensional proportions to conform to specific force, weight, strength, and similar requirements will likewise be within the ability of a person skilled in the art after the following teachings of the present invention have been read and understood.

DETAILED DESCRIPTION OF THE INVENTION

Figure 1:
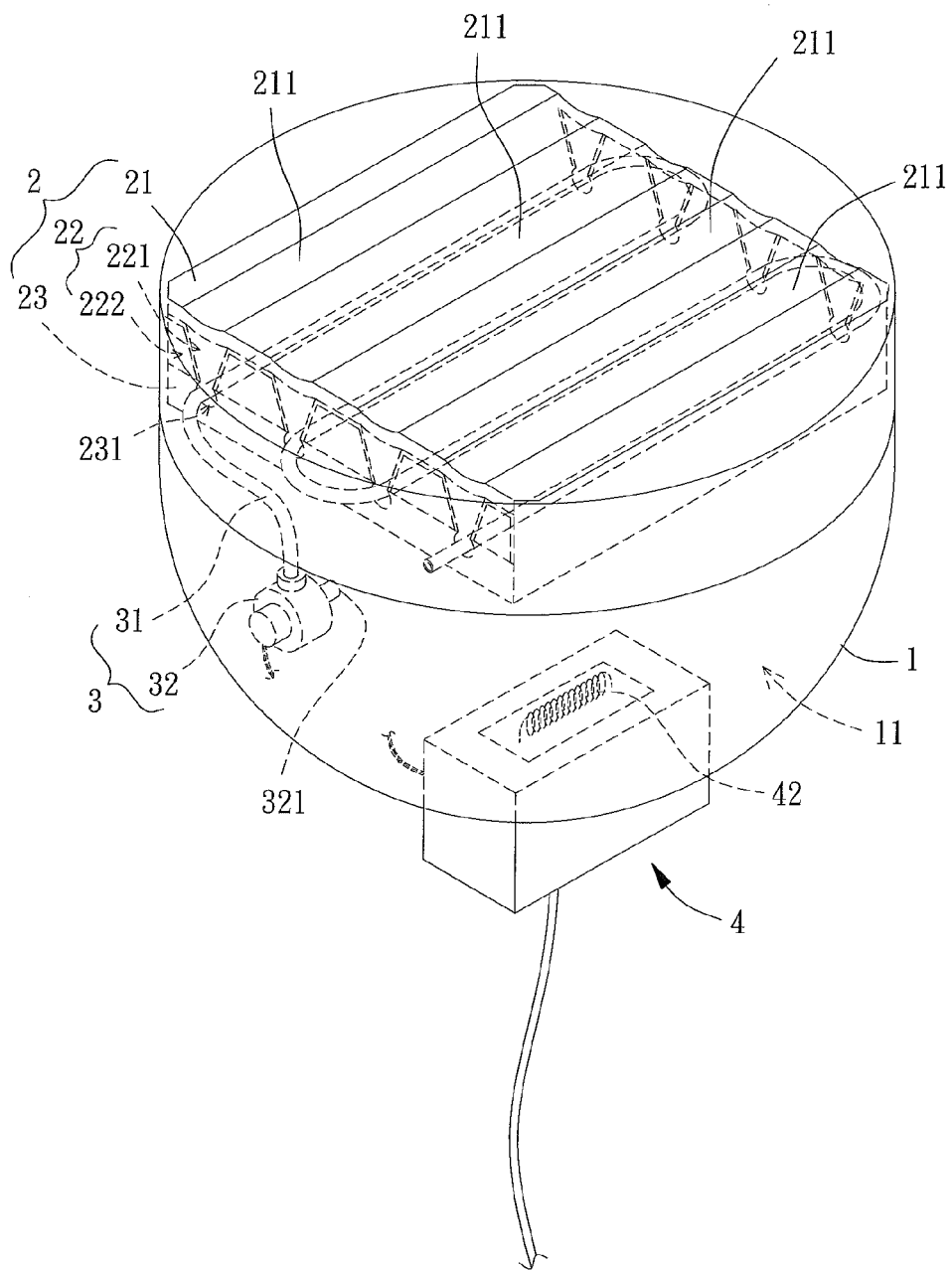
FIG. 1 shows a perspective view of a floating type solar energy collection/power device according to the present invention.
Figure 2:
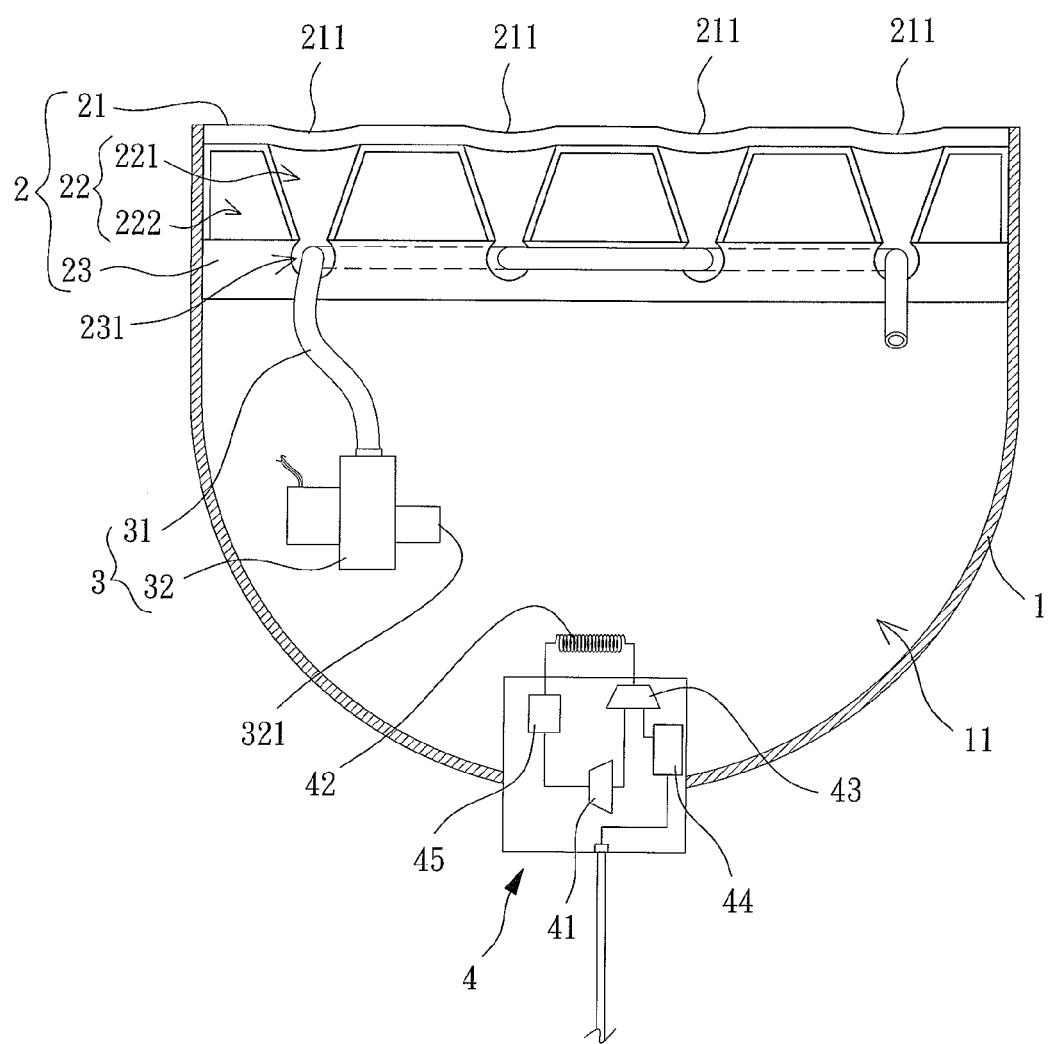
FIG. 2 shows a cross sectional view of the floating type solar energy collection/power device of FIG. 1.

With reference to FIGS. 1 and 2, a floating type solar energy collection/power device according to the present invention includes a base 1, a heating assembly 2, a heat conducting assembly 3, and a heat machine 4. The base 1 includes a compartment 11. The heat collecting assembly 2 is mounted in an opening of the compartment 11 to seal the compartment 11 of the base 1. The heat conducting assembly 3 is mounted in the compartment 11 and engaged with the heat collecting assembly 2. The heat machine 4 can undergo heat exchange with a working fluid in the sealed compartment 11.

Specifically, the compartment 11 of the base 1 receives a first working fluid. Preferably, the first working fluid is a gas having a high heat capacity ratio and having a specific weight smaller than 1, such that the first working fluid has a higher heat receiving capacity and provides a high floating force. In this embodiment, the first working fluid is helium. However, other gases can be used. The material and the shape of the base 1 are not limited. Preferably, the base 1 is made of a thermally insulating material to avoid loss of heat through the base 1.

The heat collecting assembly 2 is mounted in the opening of the compartment 11 and, thus, seals the opening. Namely, the compartment 11 is sealed to avoid leakage of the first working fluid. The heat collecting assembly 2 includes a light transmitting layer 21, a heat collecting layer 22, and a heat collecting panel 23.

The light transmitting layer 21 is made of a light transmittable material and includes a plurality of light concentrating portions 211 for concentrating the heat energy radiated from the sun. In this embodiment, each light concentrating portion 211 has a concave, arcuate face for focusing the sunlight, providing a better light collecting effect.

The heat collecting layer 22 includes a first surface connected to the light transmitting layer 21. The heat collecting layer 22 includes a plurality of first heat collecting sections 221 and a plurality of second heat collecting sections 222. Each first heat collecting section 221 is aligned with one of the light concentrating portions 211. Preferably, each first heat collecting section 221 tapers away from the light concentrating portions 211 to achieve a better heat concentrating effect. Each second heat collecting section 222 is located in an area not connected to the light concentrating portions 211. In this embodiment, each second heat collecting section 222 is located between two adjacent first heat collecting sections 221. Preferably, each second heat collecting section 222 is filled with a greenhouse gas to increase the heat absorbing effect.

The heat collecting panel 23 is connected to a second surface of the heat collecting layer 22 opposite to the first surface. The heat collecting panel 23 includes a plurality of heat collecting channels 231. Each heat collecting channel 231 is aligned with a neck of one of the first heat collecting sections 221. Preferably, the heat collecting panel 23 is made of a high thermal-conductivity material, so that the heat collecting panel 23 can accumulate an amount of heat energy the same as that accumulated by the first and second heat collecting sections 221 and 222.

The heat conducting assembly 3 includes a heat conducting tube 31 and a pump 32. The heat conducting tube 31 is preferably made of a high thermal-conductivity material. The heat conducting tube 31 extends through the heat collecting channels 231 to conduct the heat accumulated by the heat collecting channels 231. In this embodiment, the heat conducting tube 31 is a continuous tube wound through the heat collecting channels 231. The heat conducting tube 31 includes a first end in communication with the compartment 11 and a second end connected to the pump 32. Through an inlet 321 of the pump 32, the first working fluid can be driven by the pump 32 to circulate in the compartment 11, the heat conducting tube 31, and the pump 32, transferring the heat of the heat collecting tube 31 into the compartment 11.

The heat machine 4 includes a compressor 41, a heat exchanger 42, a turbine 43, and a generator 44. In this embodiment, the heat machine 4 includes a preheater 45. Furthermore, the heat machine 4 includes a plurality of pipes to connect the compressor 41, the preheater 45, the heat exchanger 42, and the turbine 43, such that a circulating loop is formed between the compressor 41, the preheater 45, the heat exchanger 42, and the turbine 43. The circulating loop is filled with a second working fluid. The turbine 43 is connected to the generator 44. When the compressor 41 drives the second working fluid to flow, the second working fluid is heated by the preheater 45 while passing through the preheater 45. Then, the second working fluid flows through the heat exchanger 42 to undergo heat exchange with the first working fluid in the compartment 11. Thus, the second working fluid absorbs the heat in the compartment 11. The location of the heat exchanger 42 is not limited. In this embodiment, the heat exchanger 42 is located in the compartment 11. When the second working fluid flows through the preheater 45 and the heat exchanger 42, the temperature of the second working fluid is increased to a level sufficient to drive the turbine 43. Thus, the turbine 43 is driven to output shaft work to the generator 44 that outputs electricity.

Still referring to FIGS. 1 and 2, in operation of the floating type solar energy collection/power device according to the present invention, the light concentrating portions 211 concentrate sunlight, and the heat energy is collected through the first heat collecting sections 221 and then concentrated at the heat collecting channels 231. The temperature of the greenhouse gas in the second heat collecting sections 222 is increased by the sunlight passing through the light transmitting layer 21, enhancing the heating effect of the heat collecting panel 23. Thus, the heat conducting tube 31 extending through the heat collecting channels 231 is in a high temperature environment, increasing the temperature of the heat conducting tube 31.

Since the first end of the heat conducting tube 31 and the inlet 321 of the pump 32 are in communication with the compartment 11, the first working fluid can circulate in the heat conducting tube 31 and the compartment 11. Specifically, the pump 32 draws the first working fluid in the compartment 11 into the heat conducting tube 31 via the inlet 321. When the first working fluid flows through the heat conducting tube 31, the heat of the heat conducting tube 31 is transferred to the first working fluid. Thus, the heat can be discharged through the first end of the heat conducting tube 31 into the compartment 11 together with the first working fluid. Through circulation of the first working fluid, the heat is transferred from the heat collecting assembly 2 into and stored in the compartment 11.

Since the heat exchanger 42 of the heat machine 4 is mounted in the compartment 11 and undergoes heat exchange with the first working fluid in the compartment 11, when the compressor 41 drives the second working fluid in the heat machine 4 to flow, the second working fluid is preheated while passing through the preheater 45. Then, the second working fluid flows through the heat exchanger 42 to absorb the heat in the compartment 11 through heat exchange. Through the two stages of heat absorption, the heat of the second working fluid is capable of driving the turbine 43 to output shaft work to the generator 44, and the generator 44 converts the shaft work into electricity. After releasing the heat to drive the turbine 43, the second working fluid returns to the compressor 41 for the next circulation.

In operation of the floating type solar energy collection/power device according to the present invention, through heat accumulation by the heating assembly 2, the heat energy is transferred through the heat conducting assembly 3 and the first working fluid into and stored in the compartment 11. When the heat machine 4 undergoes heat exchange with the compartment 11, although the heat exchange efficiency per unit time is limited, the unused heat energy still remains in the compartment 11 for heat exchange instead of being dissipated. Furthermore, since the first working fluid in the compartment 11 is a gas having a high heat capacity ratio and having a specific weight smaller than 1, the first working fluid has a higher heat receiving capacity and provides a high floating force. The whole power device can float in the air when the floating force is larger than the overall weight of the power device.

The floating type solar energy collection/power device according to the present invention provides an enhanced heat storage effect and reduces the loss of heat energy. Thus, the floating type solar energy collection/power device according to the present invention generates more energy.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A floating type solar energy collection/power device comprising:
   a base including a compartment having an opening, with a first working fluid received in the compartment and having a specific weight smaller than 1, with the first working fluid providing a floating force to the base;
   a heat collecting assembly mounted to the opening to seal the compartment;
   a heat conducting assembly mounted in the compartment, with the heat conducting assembly including a heat conducting tube and a pump, with the heat conducting tube including a first end in communication with the compartment and a second end connected to the pump, with the pump having an inlet, with the pump drawing the first working fluid into the second end of the heat conducting tube via the inlet; and
   a heat machine including a compressor, a heat exchanger, and a turbine, with the compressor, the heat exchanger, and the turbine connected to each other by a plurality of pipes, with the turbine connected to a generator, with the heat exchanger and the first working fluid undergoing heat exchange.

2. The floating type solar energy collection/power device as claimed in claim 1, with the heat collecting assembly including a light transmitting layer, a heat collecting layer, and a heat collecting panel, with the heat collecting layer including a first surface connected to the light transmitting layer and a second surface connected to the heat collecting panel.

3. The floating type solar energy collection/power device as claimed in claim 2, with the light transmitting layer including a plurality of light concentrating portions.

4. The floating type solar energy collection/power device as claimed in claim 3, with each of the plurality of light concentrating portions having a concave, arcuate face.

5. The floating type solar energy collection/power device as claimed in claim 3, with the heat collecting layer including a plurality of first heat collecting sections and a plurality of second heat collecting sections, with each of the plurality of second heat collecting sections located between two adjacent first heat collecting sections, with each of the plurality of first heat collecting sections aligned with one of the plurality of light concentrating portions.

6. The floating type solar energy collection/power device as claimed in claim 5, with each of the plurality of first heat collecting sections tapering away from the plurality of light concentrating portions.

7. The floating type solar energy collection/power device as claimed in claim 5, with each of the plurality of second heat collecting sections filled with a greenhouse gas.

8. The floating type solar energy collection/power device as claimed in claim 6, each of the plurality of first heat collecting sections having a neck, with the heat collecting panel including a plurality of heat collecting channels, with each of the plurality of heat collecting channels aligned with the neck of one of the plurality of first heat collecting sections.

9. The floating type solar energy collection/power device as claimed in claim 8, with the heat conducting tube extending through the plurality of heat collecting channels.

10. The floating type solar energy collection/power device as claimed in claim 1, with the first working fluid being helium.

11. The floating type solar energy collection/power device as claimed in claim 1, with the base made of a thermally insulating material.

12. The floating type solar energy collection/power device as claimed in claim 1, with the heat machine further including a preheater, with the preheater located between the compressor and the heat exchanger.

13. The floating type solar energy collection/power device as claimed in claim 1, with the plurality of pipes of the heat machine receiving a second working fluid.

* * * * *